United States Patent
Klug et al.

(10) Patent No.: US 6,369,004 B1
(45) Date of Patent: *Apr. 9, 2002

(54) ADDITIVES FOR INHIBITING GAS HYDRATE FORMATION

(75) Inventors: Peter Klug, Grossostheim (DE); Malcolm Kelland, Røyneberg (NO)

(73) Assignees: Clariant GmbH, Frankfurt (DE); RF-Rogaland Research, Stavanger (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,084

(22) Filed: Nov. 24, 1997

(30) Foreign Application Priority Data

Nov. 22, 1996 (DE) .............................. 19648415
Mar. 24, 1997 (NO) ............................... 97/1390
Jun. 17, 1997 (DE) .............................. 19725509

(51) Int. Cl.$^7$ ............................. E21B 37/06; C09K 7/06; C09K 3/02
(52) U.S. Cl. ................. 507/90; 507/103; 507/130; 507/242; 507/260; 137/13; 166/310; 210/698
(58) Field of Search ................. 507/90, 260, 242, 507/103, 130; 137/13; 210/698; 166/310

(56) References Cited

U.S. PATENT DOCUMENTS

| | | | |
|---|---|---|---|
| 3,244,188 A | * 4/1966 | Parks et al. | 507/90 |
| 3,578,421 A | * 5/1971 | Andress et al. | 44/392 |
| 3,965,027 A | * 6/1976 | Boffardi et al. | 252/180 |
| 4,018,702 A | * 4/1977 | Boffardi et al. | 252/392 |
| 4,518,509 A | * 5/1985 | Newsberry | 507/90 |
| 4,959,077 A | * 9/1990 | Martischius et al. | 44/392 |
| 5,178,641 A | * 1/1993 | Konrad et al. | 44/392 |

FOREIGN PATENT DOCUMENTS

| | | | |
|---|---|---|---|
| CA | 700361 | * 12/1964 | 507/90 |
| SU | 0607958 | * 5/1978 | 507/90 |
| WO | WO 95/32356 | 11/1995 | |

OTHER PUBLICATIONS

Terteryan and Khrapov "Synthesis of Alternating and Random Copolymers of Ethylene with Maleic Anhydride", Polymer Science U.S.S.R. vol. 25, No. 9, pp. 2151–2160, 1983.

M.A. Kelland, T. M. Svartaas and L.A.Dybvik, "Injection Molding" Proc. SPE Annual Technical Conference/Production Operations and Engineering, 1994, pp. 431–438.
Derwent Patent Family Report and/or Abstracts Date Unavailable.
European Search Report Date Unavailable.

* cited by examiner

Primary Examiner—Margaret Medley
(74) Attorney, Agent, or Firm—Susan S. Jackson; Scott E. Hanf

(57) ABSTRACT

An additive for inhibiting the formation of gas hydrates in connection with hydrocarbon production and transportation comprising the water-soluble polymers comprising structural elements of the formula

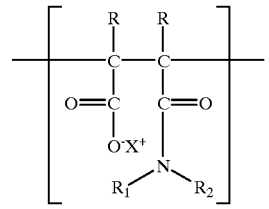

(I)

wherein
each R is independently H or $C_1$–$C_5$-alkyl;
X is H, an alkaline or earth alkaline metal or a quaternary ammonium group;
$R_1$ is H or $C_1$–$C_{18}$-alkyl; and $R_2$ is $C_1$–$C_{18}$-alkyl;
and wherein the alkyl groups represented by $R_1$ and $R_2$ optionally carry a hydroxy or amino substituent; and, optionally, a minor proportion of structural elements of the formula

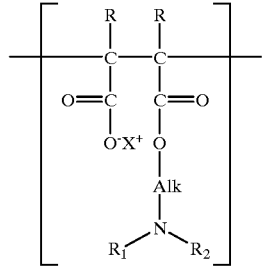

(II)

wherein R, $R_1$, $R_2$ and X may have the meaning as above, and Alk is a $C_1$–$C_5$-alkylene chain.

20 Claims, No Drawings

ADDITIVES FOR INHIBITING GAS HYDRATE FORMATION

FIELD OF INVENTION

This invention relates to the use of water-soluble polymers for inhibiting formation of gas hydrates in pipes containing oil or gas. This is relevant for both drilling and production of oil and gas.

BACKGROUND OF THE INVENTION

Gas hydrates are clathrates (inclusion compounds) of small molecules in a lattice of water molecules. In the petroleum industry natural gas and petroleum fluids contain a variety of these small molecules which can form gas hydrates. They include hydrocarbons such as methane, ethane, propane, isobutane as well as nitrogen, carbon dioxide and hydrogen sulphide. Larger hydrocarbons such as n-butane, neopentane, ethylene, cyclopentane, cyclohexane and benzene are also hydrate forming components. When these hydrate forming components are present with water at elevated pressures and reduced temperatures the mixture tends to form gas hydrate crystals. For example, ethane at a pressure of 1 MPa forms hydrates only below 4° C. whereas at 3 MPa gas hydrates can only form below 14° C. These temperatures and pressures are typical operating environments where petroleum fluids are produced and transported.

If gas hydrates are allowed to form inside a pipe used to transport natural gas and/or other petroleum fluids they can eventually block the pipe. The hydrate blockage can lead to a shutdown in production and significant financial loss. The oil and gas industry uses various means to prevent the formation of hydrate blockages in pipelines. These include heating the pipe, reducing the pressure, removing the water and adding antifreezes such as methanol and ethylene glycols which act as melting point depressants. Each of these methods is costly to implement and maintain. The most common method used today is adding antifreezes. However, these antifreezes have to be added at high concentrations, typically 10–40% by weight of the water present, in order to be effective. Recovery of the antifreezes is also usually required and is a costly procedure.

Consequently, there is a need for alternate cheap methods for preventing hydrate blockages in oil and gas drilling and production.

An alternative to the above methods is to control the gas hydrate formation process using nucleation and crystal growth inhibitors. These types of chemicals are widely known and used in other industrial processes. The advantage of using these chemicals to control gas hydrate formation is that they can be used at concentrations of 0.01 to 2% which is much lower than for antifreezes.

It is an object of this invention to provide an additive and a method of controlling gas hydrate formation using said additives added at low concentrations to a stream of at least some light hydrocarbons and water.

SUMMARY OF INVENTION

According to the present invention we provide the use of polymers which comprise structural elements of the formula

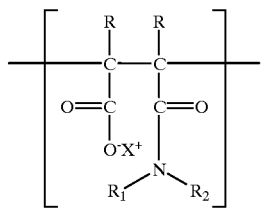

wherein
each R is independently H or $C_1$–$C_5$-alkyl;
X is H, an alkaline or earth alkaline metal or a quarternary ammonium group;
$R_1$ is H or $C_1$–$C_{18}$-alkyl; and
$R_2$ is $C_1$–$C_{18}$-alkyl;
and wherein the alkyl groups represented by $R_1$ and $R_2$ may carry a hydroxy or amino substituent;
and, if desired, a minor proportion of structural elements of the formula

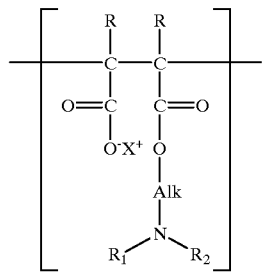

wherein $R_1$, $R_2$ and X are as above, and Alk is a $C_1$–$C_5$-alkylene chain, and, if desired, also other structural elements formed from ethylenically unsaturated monomers;
the molecular weight of the polymer being in the range from 500 to 2,000,000, as an additive for inhibiting the formation of gas hydrates in connection with hydrocarbon production and transportation.

When reference is made to formula I in the following, this may also include minor amounts of II.

The polymers preferably have a molecular weight in the range 1000–1,000,000. The units of formula I may be different, and there may also be other units which are different from formula 1. Such other units may be present in the polymer in amounts up to 90% of the polymer based on the total number of units in the polymer. Sometimes it may be advantageous to have as little as 1% of such other units in the polymer. A polymer having units of formula I and said other units in a ratio of 2.1 to 1:2 may also be preferred. The distribution of the units in the polymer may be random or an exact alternation (in particular when the ratio is 1:1).

The polymer can contain more monomers giving rise to units of formula I in a polymer formed by reaction of one or more primary or secondary amines having 1–18 carbon atoms with polymers or copolymers of maleic anhydride. Additionally the polymer can be made by reacting one of more monoamines having 1–18 carbon atoms and one or more hydroxyamines with polymers or copolymers of maleic anhydride. The polymer can be a homopolymer or a copolymer with other ethylenically unsaturated monomers including alkyl vinyl ethers, (meth)acrylates, hydroxyalkyl (meth)acrylates, vinyl carboxylates, alkenes, vinyl lactams, vinyl amides, acrylamidopropylsulphonic acid (AMPS), vinylsulphonic acid, alkyl(meth)acrylamides, styrene, allyl amides, vinylphosphoric acid and styrenesulphonic acid.

Instead of amidating the maleic anhydride polymer it is also possible to amidate the corresponding maleic anhydride to form a compound of the formula

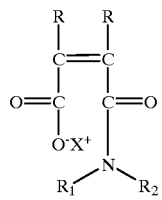

(III)

wherein
each R is independently H or $C_1$–$C_5$-alkyl;
X is H, an alkaline or earth alkaline metal or a quaternary ammonium group;
$R_1$ is H or $C_1$–$C_{18}$-alkyl, hydroxyalkyl or aminoalkyl; and
$R_2$ is $C_1$–$C_{18}$-alkyl, hydroxyalkyl or aminoalkyl.

This monomer may then be subjected to polymerisation, if required together with a comonomer.

Examples of alkylamines that can be reacted with maleic anhydride and polymers thereof to form the desired product include methylamine, dimethylamine, ethylamine, diethylamine, n-propylamine, iso-propylamine, iso-butylamine and n-butylamine.

Examples of hydroxyamines that can be added to the reaction mixture of alkylamine and maleic anhydride polymers include 2-amino-2-methyl-1-propanol, 2-aminoethanol, 2-(2-aminoethylamino)ethanol, 2-(2-aminoethoxy)ethanol, dimethylethanolamine, 3-(dimethylamino)-1-propanol, 1-(dimethylamino)-2-propanol, N,N-dibutylethanolamine and 1-amino-2-propanol as well as polyglycols of ethylene oxide, propylene oxide and butylene oxide having one amine end group.

When a hydroxydialkylamine such as 3-(dimethylamino)-1-propanol is used, the reaction with the maleic anhydride groups will always result in structural elements of formula II since a disubstituted amino group cannot react with the maleic anhydride.

Examples of alkyl diamines which can be added to the reaction mixture of alkylamine and maleic anhydride polymers include 3-dimethylaminopropylamine and 3-diethylaminopropylamine.

At least one of the alkylamines to be reacted with maleic anhydride polymers is preferably chosen from $C_3$–$C_4$-alkylamines, in particular n-propylamine, iso-propylamine, n-butylamine and isobutylamine. Thus, one of $R_1$ or $R_2$ is preferably n-propyl, iso-propyl, n-butyl or iso-butyl.

Two or more amines can be reacted with the maleic anhydride polymer to increase performance or for compatibility with the aqueous phase. Two examples to illustrate this but which are not meant to limit the scope of application include a mixture of isobutylamine and a hydroxyamine or a mixture of isobutylamine and methylamine.

The amidated maleic anhydride monomers can be structurally part of copolymers comprising other comonomers such as alkenes, alkyl vinyl ethers, (meth)acrylates, hydroxyalkyl (meth)acrylates, vinyl carboxylates, vinyl lactams, vinyl amides, acrylamidopropylsulphonic acid (AMPS), vinylsulphonic acid, alkyl(meth)acrylamides, styrene, alkyl amides, vinylphosphoric acid and styrenesulphonic acid. Examples of alkenes include 1-alkenes having 2–24 carbon atoms and iso-butylene.

Examples of (meth)acrylates include acrylic acid and acrylate salts, methacrylic acid and salts, C1–24 alkyl acrylates, C1–24 alkyl methacrylates, dimethylaminoethyl (meth)acrylate and trimethylammonium-ethyl (meth)acrylate chloride.

Examples of hydroxyalkyl (meth)acrylates include hydroxyethyl (meth)acrylate, hydroxypropyl (meth)acrylate and polyglycol esters of acrylic acid.

Examples of alkyl vinyl ethers include methyl vinyl ether and isobutyl vinyl ether.

Examples of vinyl carboxylates include vinyl acetate.

Examples of N-vinyl lactams include N-vinylcaprolactam, N-vinylpiperidone and N-vinylpyrrolidone.

Examples of vinyl amides include N-vinylacetamide, N-vinyl-N-methyl-acetamide and N-vinylformamide.

Examples of alkyl(meth)acrylamides include acrylamide, methacrylamide, N-methylacrylamide, N,N-dimethylacrylamide, N-ethylacrylamide, N,N-diethylacrylamide, N-isopropylacrylamide, N-isopropylmethacrylamide, N-isobutylacrylamide, acryloylpyrrolidine, methacryloylpyrrolidine, N-octylacrylamide, stearylacrylamide, N-methylol(meth)acrylamide, N-butoxymethyl(meth)acrylamide, N isobutoxymethyl(meth)acrylamide, dimethylaminopropyl (meth)acrylamide and trimethylammoniumpropyl(meth)acrylamide chloride.

Depending on the chemical structure of the comonomers, the effect of the resulting polymer can be either to inhibit one or more of the following processes during gas hydrate formation: nucleation or crystal growth. In addition the polymers have a scale inhibiting activity.

DETAILED DESCRIPTION OF THE INVENTION

The polymers of this invention are preferably made by reacting polymers and copolymers of maleic anhydride with one or more amines containing 1–18 carbon atoms with or without added hydroxyamines, at a low enough temperature to prevent less water-soluble cyclic imide products from forming. The amine can be a monoamine or diamine. If one mole of amine is used per mole of maleic anhydride, the product has X=H. Although it is not necessary, these monocarboxylic products can be made more water-soluble by adding base such as NaOH. If two or more moles of alkylamine are used per mole of maleic anhydride, the product has $X=RNH_3$. These products are more ionic, and therefore more water-soluble, than those formed using one mole of amine and no base. In addition, the $R_2NH_3$ ion also has some activity of its own in preventing hydrate formation, especially if $R_2$ has 4–5 carbons.

Water-solubility can be increased by using maleic anhydride copolymers comprising comonomers having polar and/or ionic groups, by using less than 1 mole equivalent of alkylamine reacted with the maleic anhydride polymer, or by reacting a mixture of hydroxyamine and an alkylamine with the maleic anhydride polymer.

As mentioned above, the polymers of this invention are useful as additives for inhibiting the formation of gas hydrates in connection with hydrocarbon production and transportation.

The additives of the present invention may in addition to the polymers of the invention and other substances also contain a liquid or solid carrier or excipient. The amount of the polymers of this invention that has to be added is generally between 0.05 and 5 wt. %, preferably between 0.05 and 0.5 wt. %, based on the amount of water in the hydrocarbon-containing mixture. The polymers can be added to a stream of light hydrocarbons and water either as powders or preferably in concentrated solution.

The polymers of this invention can also be used together with various other substances, called synergists, to improve the overall performance of the product. These synergists are:
  a) Polymers and copolymers of N-vinylcaprolactam, N-vinylpyrrolidone, alkylated vinylpyrrolidones, acryloylpyrrolidine, and polyamino acids such as polyaspartates.
  b) Butoxyethanol and 2-butoxypropanol which can also be used as a solvent medium.
  c) Tetrabutylammonium salts, tetrapentylammonium salts, tributylamine oxide, tripentylamine oxide and compounds containing the di- and trialkylammonium group, wherein the alkyl is particularly butyl or pentyl, and zwitterionic compounds having at least one butyl or pentyl group on the quaternary ammonium nitrogen atom, such as $Bu_3N^+—CH_2—COO^-$.

These synergists from classes a), b), and c) are preferably added in an amount of between 0.01 and 2.0 wt. % based on the water content.

An example of a synergist-containing product is formed by addition of 1 part of Gaffix VC713 (a terpolymer of N-vinyi caprolactam, N-vinyl pyrrolidone and dimethyiaminoethylacrylate) to 4 parts of the reaction product of "Gantrez AN-119-BF" (a methyl vinyl ether-maleic anhydride copolymer) and isobutylamine.

The polymers of this invention can be formulated with a solvent such as water, a glycol or lower alcohol or a mixture of such solvents. Other production chemicals such as corrosion inhibitors, scale inhibitors and anti-foams can be formulated with the polymers of this invention. The polymers of this invention are also suspected to have anticorrosion and antiscaling properties of their own.

Particular preference is given to products which are formed by reacting a polymer which is built up from maleic anhydride and one or more substituted or unsubstituted olefins $R^3R^4C=CH_2$ with one or more acyclic $C_2–C_{18}$-diamines and, if desired, with one or more primary or secondary $C_1–C_{12}$-monoamines, where $R^3$ and $R^4$ are, independently of one another, hydrogen or a $C_1–C_{12}$-alkyl, $C_2–C_{12}$-alkenyl or $C_6–C_{12}$-aryl radical which may be interrupted by oxygen or —CO—O— or —O—CO— and $R^3$ can also be —COOH.

The incorporation of the diamine makes it possible to prepare polymers which are water-soluble over a wide pH range, since simple reaction products of polymers based on maleic anhydride with aliphatic monoamines are polymers having carboxylate functions which become water-insoluble in an acid medium as a result of the protonation of the carboxylate groups and therefore precipitate from the aqueous solution. When suitable diamines are incorporated, the polymer takes on a cationic charge in the acid range and thus remains water-soluble.

These polymers can be alternating polymers of maleic anhydride and the corresponding olefin, as are formed, in particular, in low-pressure processes, or else random polymers having olefin: maleic anhydride molar ratios of >1 or <1 which are formed predominantly in high-pressure processes. Preference is given to a molar ratio of olefin to maleic anhydride of 1:1 to 10:1.

Many of these polymers are commercially available or can be synthesized by a simple route. Thus, polymers of maleic anhydride and vinyl ethers are obtained under the name ®Gantrez AN (ISP), ®Gantrez ES (GAF), ®Viscofras (ICI) or ®Sokalan (BASF).

Polymers of maleic anhydride and the corresponding olefins are obtainable by methods known from the literature. A summary of these syntheses is given in Methoden der Organischen Chemie, Volume E 20 (Makromolekulare Stoffe), pp. 1234–1250, Georg Thieme Verlag, Stuttgart, 1987.

The synthesis of alternating ethylene-maleic anhydride polymers and of random polymers of maleic anhydride and ethylene is described in the above reference and also in Polymer Science U.S.S.R. Vol. 25, No. 9, pp. 2151–2160, 1983.

The molecular weight of these polymers can vary within the range $1000–>10^6$ g/mol, but preference is given to molecular weights of 1000–40000 g/mol.

Diamine components which can be used are dialkyl-substituted diamines having 2 to 18 carbon atoms in the molecule, preferably having one primary and one tertiary amino group, e.g. N,N-diethylaminopropylamine, N,N-dimethylaminopropylamine, N,N-dipropylaminopropylamine and N,N-dibutylaminopropylamine. Preference is given to dialkyl-substituted diamines having 4 to 12 carbon atoms in the molecule; 3-dimethylamino-propylamine is very particularly suitable.

Suitable monoamine components are monoamines having a primary or secondary amino group and 1 to 12 carbon atoms in the molecule. Preference is given to amines of the formula $R^5NH_2$ where $R^5$ is an unsubstituted, branched or unbranched alkyl radical having 1 to 12, preferably 1 to 5, carbon atoms. Examples are methylamine, ethylamine, propylamine, isopropylamine, n-butylamine, isobutylamine, the isomeric pentylamines and hexylamines, as well as octylamine and dodecylamine.

The polymers to be used according to the invention are prepared, for example, by reacting the polymer which is built up from maleic anhydride and one or more olefins with the above-mentioned monoamines and diamines in an aqueous or aqueous-alcoholic medium, the polymer being slowly introduced into the solution of the amines. Suitable alcoholic solvents are water-soluble mono-alcohols, e.g. methane, ethanol, propanoles, butanoles and oxethylated monoalcohols as butyle glycol and butyle diglycol.

The sum of the molar amounts of the diamines and monoamines is 80–200% based on the anhydride content of the polymer. However, the diamines and monoamines are preferably added in such amounts that the sum of the amounts of diamines and monoamines corresponds to the anhydride content of the polymer. The molar ratio of diamine to monoamine is 100:0 to 10:90.

The reaction temperature selected can be from 0° C. to the boiling point of the solvent, but is preferably selected so as to be below 50° C. in order to make possible the formation of monoamide structures and to suppress ring closure reactions which form the cyclic imide. Clear solutions of the modified polymers are formed.

The above mentioned synergists include mixtures of polyamides with one or more different polymers having a carbon backbone and amide bonds in the side chains.

These include, in particular, polymers such as polyvinylpyrrolidone, polyvinylcaprolactam, polymers of vinylpyrrolidone and vinylcaprolactam, and also terpolymers of vinylpyrrolidone, vinylcaprolactam and further anionic, cationic and uncharged comonomers having a vinylic double bond, e.g. 1-olefins, N-alkylacrylamides, N-vinylacetamide, acrylamide, sodium 2-acrylamido-2-methyl-1-propanesulfonate (AMPS) or acrylic acid. Mixtures comprising homopolymers and copolymers of N,N- dialkylacrylamides such as N-acryloylpyrrolidine, N-acryloylmorpholine and N-acryloylpiperidine are also suitable. Likewise suitable are mixtures comprising alkylpolyglycosides, hydroxyethylcellulose, carboxymethylcellulose and other ionic or nonionic surfactant molecules. Particularly suitable mixtures are ones comprising quaternary ammonium salts, specifically tetrabutylammonium bromide and amine oxides such as tributylamine oxide.

SYNTHESIS OF THE POLYMERS

EXAMPLE 1

9.15 g (89.5 mmol) of 3-dimethylaminopropylamine and 6.55 g (89.5 mmol) of isobutylamine are initially charged in 50.7 g of butyl glycol and 101.4 g of water at 25° C. and 35.0 g (179 mmol) of an ethylene-maleic anhydride polymer having a maleic anhydride content of 50% by mass (molecular weight according to gel permeation chromatography ca. 10000) in powdered form are added over a period of 2 minutes. The reaction mixture heats up to 50° C. and after the exothermic reaction is complete is stirred further for 2 hours at 50° C. This gives a yellow, fluid solution having a content of 25% and a pH (1% in deionized water) of 8.0. The product has a solubility of 1% in deionized water at pH 1, pH 3 and pH 11.

EXAMPLE 2

18.3 g (179 mmol) of 3-dimethylaminopropylamine are initially charged in 53.3 g of butyl glycol and 106.6 g of water at 25° C. and 35.0 g (179 mmol) of an ethylene-maleic anhydride polymer having a maleic anhydride content of 50% by mass (molecular weight according to GPC ca. 10000) in powdered form are added over a period of 2 minutes. The reaction mixture heats up to 50° C. and after the exothermic reaction is complete is stirred further for 2 hours at 50° C. This gives a yellow, fluid solution having a content of 25% and a pH (1% in deionized water) of 9.4. The product has a solubility of 1% in deionized water at pH 1, pH 3 and pH 11.

EXAMPLE 3

7.15 g (70.0 mmol) of 3-dimethylaminopropylamine and 5.12 g (70.0 mmol) of isobutylamine are initially charged in 47.3 g of butyl glycol and 94.5 g of water at 25° C. and 35.0 g (140 mmol) of an ethylene-maleic anhydride polymer having a maleic anhydride content of 40% by mass (molecular weight according to GPC ca. 10000) in powdered form are added over a period of 2 minutes. The reaction mixture heats up to 50° C. and after the exothermic reaction is complete is stirred further for 2 hours at 50° C. This gives a yellow, fluid, slightly turbid solution having a content of 25% and a pH (1% in deionized water) of 8.9. The product has a solubility, to give a transparent solution, of 1% in deionized water at pH 1, pH 3 and pH 11.

EXAMPLE 4

8.33 g (81.5 mmol) of 3-dimethylaminopropylamine and 5.96 g (81.5 mmol) of isobutylamine are initially charged in 44.3 g of butyl glycol and 88.6 g of water at 25° C. and 30.0 g (140 mmol) of a vinyl acetate-maleic anhydride polymer (molecular weight according to GPC ca. 15000) in powdered form are added over a period of 2 minutes. The reaction mixture heats up to 45° C. and after the exothermic reaction is complete is stirred further for 2 hours at 50° C. This gives a yellow, fluid, slightly turbid solution having a content of 25% and a pH (1% in deionized water) of 5.8. The product has a solubility, to give a clear solution, of 1% in deionized water at pH 1, pH 3 and pH 11.

EXAMPLE 5

7.76 g (76.0 mmol) of 3-dimethylaminopropylamine and 5.56 g (76.0 mmol) of isobutylamine are initially charged in 43.3 g of butyl glycol and 86.6 g of water at 25° C. and 30.0 g (152 mmol) of an alternating vinyl isobutyl ether-maleic anhydride polymer (molecular weight according to GPC ca. 18000) in powdered form are added over a period of 3 minutes. The reaction mixture heats up to 48° C. and after the exothermic reaction is complete is stirred further for 2 hours at 50° C. This gives a clear, orange, fluid solution having a content of 25% and a pH (1% in deionized water) of 6.2. The product has a solubility, to give a clear solution, of 1% in deionized water at pH 1, pH 3 and pH 11.

EXAMPLE 6

15.5 g (152 mmol) of 3-dimethylaminopropylamine are initially charged in 45.5 g of butyl glycol and 91.1 g of water at 25° C. and 30.0 g (152 mmol) of an alternating vinyl n-butyl ether-maleic anhydride polymer (molecular weight according to GPC ca. 16000) in powdered form are added over a period of 3 minutes. The reaction mixture heats up to 42° C. and after the exothermic reaction is complete is stirred further for 2 hours at 50° C. This gives a turbid, yellowish solution having a content of 25% and a pH (1% in deionized water) of 7.0. The product has a solubility, to give a clear solution, of 1% in deionized water at pH 1, pH 3 and pH 11.

EXAMPLE 7

7.76 g (76.0 mmol) of 3-dimethylaminopropylamine and 5.56 g (76.0 mmol) of isobutylamine are initially charged in 43.3 g of butyl glycol and 86.6 g of water at 25° C. and 30.0 g (152 mmol) of an alternating vinyl n-butyl ether-maleic anhydride polymer (molecular weight according to GPC ca. 16000) in powdered form are added over a period of 3 minutes. The reaction mixture heats up to 48° C. and after the exothermic reaction is complete is stirred further for 2 hours at 50° C. This gives a clear, orange solution having a content of 25% and a pH (1% in deionized water) of 5.9. The product has a solubility, to give a clear solution, of 1% in deionized water at pH 1, pH 3 and pH 11.

EXAMPLE 8

7.76 g (76.0 mmol) of 3-dimethylaminopropylamine and 4.50 g (76.0 mmol) of isopropylamine are initially charged in 42.3 g of butyl glycol and 84.5 g of water at 25° C. and 30.0 g (152 mmol) of an alternating vinyl isobutyl ether-maleic anhydride polymer (molecular weight according to GPC ca. 18000) in powdered form are added over a period of 3 minutes. The reaction mixture heats up to 48° C. and after the exothermic reaction is complete is stirred further for 2 hours at 50° C. This gives a clear, pale yellow, fluid solution having a content of 25% and a pH (1% in deionized water) of 6.2. The product has a solubility, to give a clear solution, of 1% in deionized water at pH 3 and pH 11.

EXAMPLE 9

7.76 g (76.0 mmol) of 3-dimethylaminopropylamine and 5.40 g (76.0 mmol) of a 63.5 % strength aqueous ethylamine solution are initially charged in 43.2 g of butyl glycol and 86.4 g of water at 25° C. and 30.0 g (152 mmol) of an alternating vinyl n-butyl ether-maleic anhydride polymer (molecular weight according to GPC ca. 16000) in powdered form are added over a period of 3 minutes. The reaction mixture heats up to 45° C. and after the exothermic reaction is complete is stirred further for 2 hours at 50° C. This gives a clear, pale yellow solution having a content of 25% and a pH (1% in deionized water) of 6.0. The product has a solubility, to give a clear solution, of 1% in deionized water at pH 1 and pH 11.

Effectiveness of the Polymers

The effectiveness of the polyamides was studied by means of a THF hydrate test. Since natural gas hydrates exist only at high pressures which are obtainable only with difficulty under laboratory conditions, the formation of clathrates of THF (tetrahydrofuran) and water is used as a model. These hydrates are formed at atmospheric pressure at 4° C. at a water: THF molar ratio of 17:1. If an additive kinetically inhibits the formation of THF hydrates or keeps the THF hydrates formed stirrable, then this additive should have a similar effect on naturally occurring gas hydrates.

As can be shown in the experimental examples below, in the absence of inhibitor, THF hydrate formation commences quickly under the experimental conditions and leads to the formation of THF hydrates in acicular or platelet form, which very quickly causes the entire test solution to solidify. Addition of the polymer significantly slows the THF hydrate formation and/or alters the crystal form of the hydrates formed.

All polyamides used significantly slow the THF hydrate formation.

The THF test was carried out as follows:

Experiment without Inhibitor:

A short Pasteur pipette (I=140 mm) is fixed in a bored cork stopper in such a way that the tip of the pipette projects 120 mm from the cork stopper. A drop of a THF/water mixture (1:17) is then taken up into this pipette by means of capillary action, the pipette (with cork stopper) is weighed and cooled for at least 2 hours at −20° C.

A 3.5% strength sodium chloride solution is mixed with THF in a ratio of 4:1. 30 ml of this solution are placed in a test tube (150×30 mm) and cooled for 25 minutes at 0° C. in a cooling bath (the test tube dips into the cooling bath to a depth of about 60 mm).

The frozen pipette is taken from the refrigerator, wiped quickly (in order to remove crystal nuclei from the outside of the pipette and thus obtain uniform starting conditions) and immediately dipped to a depth of about 15 mm into the above THF/water/sodium chloride mixture, with THF hydrates being formed after a short time (a few minutes).

After 60 minutes, the pipette is taken very carefully from the test tube and the pipette together with cork stopper and adhering hydrates is immediately weighed. The rate of THF hydrate formation (in g/h) is calculated from the difference between initial and final weights and the elapsed time.

EXAMPLES 1–9

The procedure of the blank determination is repeated, but 5000 ppm (based on the water content of the mixture) of the appropriate inhibitor is added to the test solution. The evaluation is carried out as above.

The results are summarized in Table 1 and show the effectiveness of the compounds used:

TABLE 1

THF test, hydrate formation rates

| Example | Inhibitor | FR |
|---|---|---|
|  | Blank without addition of inhibitor | 6.8 |
| 1 | Ethylene-maleic anhydride polymer, 50% by weight of MA, reaction with 50 mol % of isobutylamine and 50 mol % of dimethylaminopropylamine | 1.2 |
| 2 | Ethylene-maleic anhydride polymer, 50% by weight of MA, reaction with 100 mol % of dimethylaminopropylamine | 0.5 |
| 3 | Ethylene-maleic anhydride polymer, 40% by weight of MA, reaction with 50 mol % of isobutylamine and 50 mol % of dimethylaminopropylamine | 2.0 |
| 4 | Maleic anhydride-vinyl acetate polymer, reaction with 50 mol % of isobutylamine and 50 mol % of dimethylaminopropylamine | 0.6 |
| 5 | Maleic anhydride-vinyl isobutyl ether polymer, reaction with 50 mol % of isobutylamine and 50 mol % of dimethylaminopropylamine | 0.6 |
| 6 | Maleic anhydride-vinyl n-butyl ether polymer, reaction with 100 mol % of dimethylaminopropylamine | 0.8 |
| 7 | Maleic anhydride-vinyl n-butyl ether polymer, reaction with 50 mol % of isobutylamine and 50 mol % of dimethylaminopropylamine | 0.5 |
| 8 | Maleic anhydride-vinyl isobutyl ether polymer, reaction with 50 mol % of isopropylamine and 50 mol % of dimethylaminopropylamine | 3.2 |
| 9 | Maleic anhydride-vinyl isobutyl ether polymer, reaction with 50 mol % of ethylamine and 50 mol % of dimethylaminopropylamine | 1.8 |

FR = formation rate (g/h)

In addition, the effectiveness of the polymers of the invention was studied by means of autoclave experiments under isochoric conditions (at constant volume) using water/gas mixtures.

For this purpose, in the reference experiment, deionized water is treated in an autoclave with about 50 bar of a natural gas which forms structure II hydrates (predominantly methane, n-propane content >1%) and cooled while stirring (stirring speed 250 rpm) according to a temperature program (see below). The pressure changes indicate nucleation and crystal growth of the gas hydrates and the torque produced, which represents a measure of hydrate agglomeration, is measured by means of a torque sensor.

As can be shown in the experimental examples below, gas hydrate formation commences quickly without inhibitor under the experimental conditions and leads to a great increase in torque, so that the formation of large hydrate agglomerates can be concluded.

In contrast, the addition of small amounts (in all examples 500 ppm=0.05%) of the polymers of the invention leads either to a considerable delay in hydrate formation (Example 1) or to complete inhibition of gas hydrate formation over the entire duration of the experiment (Example 4/5).

The apparatus for measuring gas hydrate inhibition is described in D. Lippmann, Thesis, Techn. Universitat Clausthal, 1995.

The test products were dissolved in 88 ml of deionized water in a steel stirring autoclave provided with temperature control and a torque sensor (stirring speed: 250 rpm) at a volume ratio of gas to aqueous phase of 8:2, and the autoclave was pressurized with gas to 49–53 bar. From an initial temperature of 17.5° C., the contents of the autoclave were cooled to 2° C. over a period of 2 hours, then stirred for 20 hours at 2° C. and again warmed to 17.5° C. over a period of 2 hours. During cooling, a small decrease in pressure corresponding to the thermal contraction of the gas was first observed. When formation of gas hydrate nuclei occurs, the measured pressure decreases and a rise in the measured torque is observed; in the absence of inhibitor, further crystal growth and increasing agglomeration of these hydrate nuclei quickly leads to a further increase in the measured torque. The time from reaching the minimum temperature of 2° C. to the first decrease in the gas pressure is referred to as the induction time. On warming the reaction mixture, the gas hydrates finally decompose again, so that at the end of the experiment the initial state is restored.

| Example | Concentration of active substance (ppm) | Pressure decrease Δp (bar) | Max. torque (Ncm) | Hydrate formation | Induction time (h) |
|---|---|---|---|---|---|
| Reference | — | 22 | 13 | strong | 4.1 |
| 1 | 500 | 12,9 | 8 | yes | 11.8 |
| 4 | 500 | — | <0.1 | none | >20 |
| 5 | 500 | — | <0.1 | none | >20 |

The agreement of the THF test results with the experimental examples under high-pressure conditions show that the behavior of an inhibitor in the THF test is a valid measure of the effectiveness under high-pressure conditions.

In order to demonstrate the increased saltwater compatibility of the modified maleic anhydride copolymers of the invention compared with conventional products based on polyvinylpyrrolidone/polyvinylcaprolactam, the cloud points of 1% strength solutions of the corresponding polymers in a 3.6% strength sodium chloride solution were measured (%=% by weight).

| Polymer | Cloud point | Remarks |
|---|---|---|
| Example 4 | >90° C. | — |
| Example 5 | 50° C. | — |
| Copolymer VC 713 | 40° C. | Vinylpyrrolidone-vinylcaprolactam/2-dimethylaminoethyl methacrylate copolymer (product of GAF Chemicals Corp.) |

FURTHER EXAMPLES

Equipment and Test Procedure

To evaluate the performance of the hydrate inhibitor polymers of this invention, the examples given herein use high pressure sapphire cells and methods of using them described in M. A. Kelland, T. M. Svartaas and L. A. Dybvik, Proc. SPE Annual Technical Conference/Production Operations and Engineering, 1994, pp 431–438.

The equipment used is illustrated in FIG. 1. The sapphire cell was mounted in a cooling bath. The sapphire cell consists of a sapphire tube 1 enclosed in a holder between two stainless steel end pieces. The cell has an internal diameter of 20 mm, height of 100 mm and a wall thickness of 20 mm. 15 mm of the top piece and 13 mm of the bottom piece protrudes into the cell, and the total volume between the top and bottom piece is 22.6 ml. The sapphire cell is equipped with a stirrer mechanism. A stirrer blade 2 is connected to a magnet housing in the bottom end piece via an axle. An external rotating magnetic field 3 created by a laboratory stirrer bar drive is used to regulate the stirrer speed. The stirrer motor can be regulated to maintain a constant speed (independent of motor load) in the range 0 to 1700 rpm. The regulator/amplifier unit has output connections for both torque and rotation speed readings. The stirrer speed readings are calibrated using a stroboscope.

The sapphire cell is placed inside separate double-walled, transparent carbonate plastic cylinders with four separate windows at 0, 90, 180, 270° for visual observations. Temperature control of the cell is obtained by circulating water in the plastic cyclinders and through a cooler/heater unit 8 connected to a temperature control unit 9. The cell system is equipped with two temperature sensors for the measurement of the temperature inside the cell 5 (in the gas phase) and in the water bath 6. Pressure is measured with a pressure transducer through the inlet tubing connection in the top end piece of the cell. The temperature was measured to an accuracy of ±0.1° C. and the pressure was measured to an accuracy of ±0.2 bar. Video recordings of the experiments were also made. All data were collected in a data logger 10. The data could be output on a printer/plotter 11.

The same procedure for preparation of the experiment and filling of the cell was followed in all experiments. All tests were performed on fresh synthetic sea water (SSW=3.6%) and synthetic natural gas (SNG). Condensate was added in experiments 23–25.

A description of the general test procedure is given here:
1) The polymer to be tested was dissolved or dispersed in synthetic sea water (SSW) to the desired concentration.
2) The magnet housing of the cell was filled with the aqueous solution containing the inhibitor to be tested. The magnet housing was then mounted in the bottom end piece of the cell, which was thereafter attached to the sapphire tube and the cell holder.
3) The desired amount of the aqueous solution containing dissolved inhibitor was placed in the cell (above the cell bottom) using a pipette, the top end piece was fitted, and the cell was placed in the cooling bath (plastic cylinder).
4) The temperature of the cooling bath was adjusted to 2–3° C. outside the hydrate region at the pressure conditions to be used in the experiment.
5) Prior to loading the cell with hydrocarbon gas or condensate, it was purged twice with the SNG used in the experimental hydrocarbon fluid.
6) The data logging and video recording were started, and the cell was loaded with the hydrocarbon fluid to the desired pressure while stirring at 700 rpm. Normally, the hydrocarbon fluid was SNG.

When the temperature and pressure in the cell had stabilised the experiment was started.

All nucleation/crystal growth experiments, called "kinetic inhibition" experiments, were conducted at constant temperature. Once the temperature and pressure had stabilised after loading of the cell the stirring was stopped. The closed cell was then cooled to the experimental temperature, resulting in a decrease in pressure. When the temperature and pressure again had stabilised, stirring at 700 rpm was started. The induction time, ti, for hydrate formation was measured from the time of start of stirring at the experimental temperature. The time from start of hydrate formation to the time when rapid growth of hydrate ensues is called the crystal growth delay time, St-1.

The procedures given herein for synthesis of polymers by reacting amines with maleic anhydride copolymers are only examples of the possible synthetic techniques which can be used for the methods according to the invention.

Kinetic Inhibition Experiments

Examples 10–19 are carried out using SNG and brine at 90 bar and 7.5° C. (ΔT=13.8° C.).

EXAMPLE 10

Several kinetic inhibition experiments were carried out with no additives. The total delay time before rapid gas uptake took place (i.e. the induction time $t_i$ plus crystal growth delay time St-1) was less than 3 minutes in all experiments.

EXAMPLE 11

Ethylene-maleic anhydride copolymer was added as a fine powder to a solution of n-PrNH$_2$ in diethyl ether at room temperature and stirred for 1 hour. 1 mol of n-PrNH$_2$ was used per mol of maleic anhydride in the copolymer. The slurry was evaporated to dryness to leave a white solid. When tested for kinetic inhibition at 0.5 wt. % in 3.6% SSW, the product gave $t_i$=137 minutes and St-1=37 minutes.

EXAMPLE 12

Ethylene-maleic anhydride copolymer was added as a fine powder to a solution of i-BuNH$_2$ in diethyl ether at room temperature and stirred for 1 hour. 1 mol of i-BuNH$_2$ was used per mol of maleic anhydride in the copolymer. The slurry was evaporated to dryness to leave a white solid. When tested for kinetic inhibition at 0.5 wt. % in 3.6% SSW, the product gave $t_i$=885 minutes and St-1=183 minutes.

EXAMPLE 13

Ethylene-maleic anhydride copolymer was added slowly as a fine powder to an excess neat solution of isopropylamine at room temperature and stirred for 1 hour. The slurry was evaporated to dryness to leave an off-white solid. When tested for kinetic inhibition at 0.5 wt. % in 3.6% SSW, the product gave $t_i$=115 minutes and St-1=15 minutes.

EXAMPLE 14

Ethylene-maleic anhydride copolymer was added slowly as a fine powder to an excess neat solution of n-butylamine at room temperature and stirred for 1 hour. The slurry was evaporated to dryness to leave an off-white solid. When tested for kinetic inhibition at 0.5 wt. % in 3.6% SSW, the product gave $t_i$=117 5 minutes and St-1=55 minutes in a first experiment and $t_i$=190 minutes and St-1=37 minutes in a second experiment.

EXAMPLE 15

Ethylene-maleic anhydride copolymer was added slowly as a fine powder to an excess neat solution of isobutylamine at room temperature and stirred for 1 hour. The slurry was evaporated to dryness to leave an off-white solid. When tested for kinetic inhibition at 0.5 wt. % in 3.6% SSW, the product gave $t_i$=103 minutes and St-1=171 minutes in a first experiment and $t_i$=118 minutes and St-1=153 minutes in a second experiment.

EXAMPLE 16

Ethylene-maleic anhydride copolymer was added slowly as a fine powder to an excess neat solution of isopentylamine at room temperature and stirred for 1 hour. The slurry was evaporated to dryness to leave an off-white solid. When tested for kinetic inhibition at 0.5 wt. % in 3.6% SSW, the product gave $t_i$=21 minutes and St-1=27 minutes.

EXAMPLE 17

A product formed by reacting Gantrex AN-119-BF (methyl vinyl ether-maleic anhydride copolymer) and isobutylamine was tested for kinetic inhibition at 0.5 wt. % in 3.6% SSW. The product gave $t_i$=48 minutes and St-1=43 minutes.

EXAMPLE 18

A similar product to Example 8 formed by reacting Gantrex AN-1 169-BF (methyl vinyl ether-maleic anhydride copolymer) and isobutylamine was tested for kinetic inhibition at 0.5 wt. % in 3.6% SSW. The product gave $t_i$=106 minutes and St-1=60 minutes in the first experiment and $t_i$1=256 minutes and St-1=69 minutes in a second experiment.

EXAMPLE 19

A product formed by reacting Gantrez AN-169-BF (methyl vinyl ether-maleic anhydride copolymer) with an excess of isobutylamine and ethanolamine in 4:1 molar ratio was tested for kinetic inhibition at 0.5 wt. % in 3.6% SSW. The product gave $t_i$>1212 minutes.

EXAMPLE 20

A product formed by reacting isobutyl vinyl ether-maleic anhydride copolymer with a mixture of isobutylamine and dimethylaminopropylamine was tested for kinetic inhibition at 0.5 wt. % in 3.6% SSW. The product gave $t_i$=795 minutes and St-1=192 minutes.

EXAMPLE 21

The polymer product used in Example 11 was tested for kinetic inhibition at 0.4 wt. % in 3.6% SSW with the addition of 0.1 wt. % vinyl pyrrolidone-vinyl-caprolactam 1:1 copolymer. The product gave $t_i$=1222 minutes.

EXAMPLE 22

The polymer product used in Example 11 was tested for kinetic inhibition at 0.4 wt. % in 3.6% SSW with the addition of 0.1 wt. % tributylamine oxide. The product gave $t_i$=1059 minutes and St-1=32 minutes.

Kinetic Inhibition Experiments using SNG and Condensate

Examples 23–25 were carried out at using a North Sea condensate and the same SNG and brine as in Examples 1–13, at 90 bar but at different temperatures.

EXAMPLE 23

The polymer product used in Example 3 was tested for kinetic inhibition at 0.5 wt. % in 3.6% SSW at 8.8° C. (DT=9.7° C.). The product gave $t_i$=621 minutes and St-1=48 minutes. In an identical experiment at 6.8° C. (DT=11.7° C.), the result was $t_i$=28 minutes and St-1=10 minutes. Without an additive this system plugs with hydrate in less than 5 minutes at either 8.8° C. or 6.8° C.

EXAMPLE 24

The polymer product used in Example 3 was tested for kinetic inhibition at 0.5 wt. % in 3.6% SSW at 6.8° C. with the addition of 0.1% of polyvinyl-caprolactam. The product gave $t_i$=480 minutes and St-1=300 minutes.

EXAMPLE 25

The polymer product used in Example 3 was tested for kinetic inhibition at 0.5 wt. % in 3.6% SSW at 6.8° C. with the addition of 0.1% of tetrabutyl-ammonium bromide. The product gave $t_i$=145 minutes and St-1=25 minutes.

What is claimed is:

1. A method of use for inhibiting the formation of gas hydrates in pipes containing water and gas or oil, comprising incorporating from 0.05 to 5% by weight based on the amount of said water present, an additive in said pipes, said additive comprising a water-soluble polymer or copolymer comprising structural units of the formula

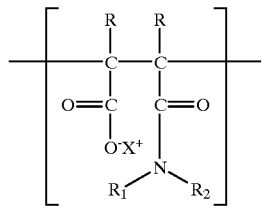
(I)

wherein
- each R is independently H or $C_1$–$C_5$-alkyl;
- X is H, an alkaline or earth alkaline metal or a quaternary ammonium group;
- $R_1$ is H or $C_1$–$C_{18}$-alkyl; and
- $R_2$ is $C_1$–$C_{18}$-alkyl;
- and wherein the alkyl groups represented by $R_1$ and $R_2$ optionally carry a hydroxy or amino substituent;
- and optionally said polymer contains a minor proportion of structural units of the formula (II)

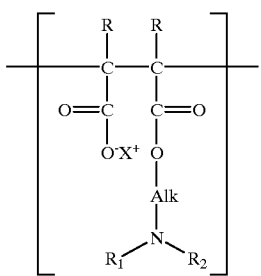
(II)

wherein said polymer comprising (I) and optionally (II) has a molecular weight of from 500 to 2,000,000, R, $R_1$, $R_2$ and X have the meaning as above, and Alk is a $C_1$–$C_5$-alkylene chain, and said polymer further comprises more than one structural unit from different monomers of formula (I) and optionally, (II).

2. The method of claim 1, wherein $R_1$ carries a primary or tertiary amine group and $R_1$ and $R_2$ have togather 4 to 12 carbon atoms.

3. The method of claim 1, wherein $R_1$ is H and $R_2$ is 3-dimethylaminopropyl.

4. The method as claimed in claim 1 in which R is H.

5. The method as claimed in claim 1 in which $R_1$ is H and $R_2$ is $C_3$–$C_4$-alkyl.

6. The method of claim 1, wherein $R_1$ is H and $R_2$ is $C_1$ to $C_{12}$-alkyl.

7. The method as claimed in claim 1 further comprising ethylenically unsaturated comonomers.

8. Thee method as claimed in claim 7 wherein said ethylenic unsaturated comonomers are present at up to 90 Mol-%.

9. The method of use as claimed in claim 8, wherein the ratio of the number of units of formula (I) and, if present, (II) to the number of other units is in the range of 2:1 to 1:2.

10. The method as claimed in claim 1 wherein said water soluble polymer structural units (I) are derived from repeating units of maleic anhydride and one or more substituted or unsubstituted olefins $R^3R^4$ C=$CH_2$, wherein said maleic anhydride has been reacted with acyclic $C_2$–$C_{18}$ diamines and, optionally primary and/or secondary $C_1$–$C_{12}$-monoamines, where $R^3$ and $R^4$ are, independently of one another, hydrogen or a $C_1$–$C_{12}$-alkyl, $C_2$–$C_{12}$-alkenyl or $C_6$–$C_{12}$-aryl radical which may be interrupted by oxygen or —CO—O— or —O—CO— and $R^3$ can also be —COOH.

11. The method of use as claimed in claim 10, wherein the polymer is built up from maleic anhydride and ethylene.

12. The method of use as claimed in claim 10, wherein the polymer is built up from maleic anhydride and one or more vinyl ethers.

13. The method of use as claimed in claim 10, wherein the polymer is built up from maleic anhydride and vinyl acetate.

14. The method of use as claimed in claim 10, wherein the polymer is built up from maleic anhydride and styrene.

15. The method of use as claimed in claim 10, wherein the diamine is acyclical, has a primary or tertiary amine group and 4–12 carbon atoms in the molecule.

16. The method of use as claimed in claim 10, wherein the diamine is 3-dimethylaminopropylamine.

17. The method of use as claimed in claim 10, wherein the monoamine is a primary monoamine with 1–12 carbon atoms in the molecule.

18. The method of use as claimed in claim 10, wherein the monoamine is a primary monoamine with 1–5 carbon atoms in the molecule.

19. The method of use as claimed in claim 10 in mixture with one or more polymers which are built up from a carbon backbone, obtained by polymerisation, and amide bonds in the lateral chains and in mixture with quaternary ammonium salts and amine oxides.

20. A method of inhibiting gas hydrate formation, in a system for oil and gas drilling, production and/or transportation, which comprises adding to the system an additive comprising a water soluble polymer or copolymer comprising structural units of the formula

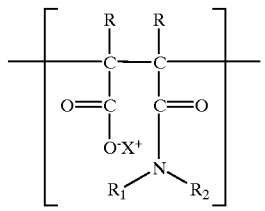
(I)

wherein
- each R is independently H or $C_1$–$C_5$-alkyl;
- X is H, an alkaline or earth alkaline metal or a quartemnary ammonium group;
- $R_1$ is H or $C_1$–$C_{18}$-alkyl; and
- $R_2$ is $C_1$–$C_{18}$-alkyl;
- and wherein the alkyl groups represented by $R_1$ and $R_2$ optionally carry a hydroxy or amino substituent;
- and optionally said polymer contains a minor proportion of structural units of the formula

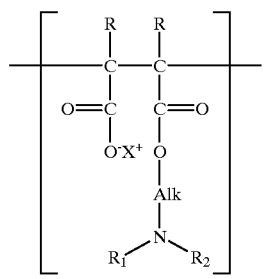

wherein said polymer comprising (I) and optionally (II) has a molecular weight of from 500 to 2,000,000, R, $R_1$, $R_2$ and X have the meaning as above, and Alk is a $C_1$–$C_5$-alkylene chain, said additive is added in an amount of 0.01 to 2% by weight based on the water present in the system; and wherein said additive further comprises a synergist in combination with said polymer, and wherein the synergist is:
a) a polymer or copolymer of N-vinylcaprolactam, N-vinylpyrrolidone, alkylated vinylpyrrolidone, acryloylpyrrolidine, or a polyamino acid,
b) butoxyethanol or 2-butoxypropanol, or
c) tetrabutylammonium salt, tetrapentylammonium salt, tributylamine oxide, tripentyl amine oxide, a compound containing a di- and/or trialkylammonium group, wherein the alkyl is butyl or pentyl, or a zwitterionic compound having at least one butyl or pentyl group on the quaternary ammonium nitrogen atom.

* * * * *